(12) United States Patent
Hess et al.

(10) Patent No.: US 6,205,752 B1
(45) Date of Patent: Mar. 27, 2001

(54) ROLLING CROP GUIDE FOR DISC MOWER CONDITIONERS

(75) Inventors: David A. Hess; Charles H. Hoffman, both of New Holland, PA (US)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 09/412,456

(22) Filed: Oct. 4, 1999

Related U.S. Application Data

(60) Continuation-in-part of application No. 09/072,240, filed on May 4, 1998, now Pat. No. 5,970,689, which is a division of application No. 08/670,060, filed on Jun. 25, 1996, now Pat. No. 5,778,647.
(60) Provisional application No. 60/000,817, filed on Jun. 26, 1995.

(51) Int. Cl.[7] .................................................. A01D 75/30
(52) U.S. Cl. ........................................................... 56/6
(58) Field of Search .................................. 56/6, 218, 208, 56/13.6, 14.4, 320.1, DIG. 16, DIG. 17, DIG. 20, DIG. 24

(56) References Cited

U.S. PATENT DOCUMENTS

| | | | |
|---|---|---|---|
| 4,385,484 | * | 5/1983 | Ehrhart et al. ....................... 56/320.1 |
| 5,768,865 | * | 6/1998 | Rosenbalm et al. ......................... 56/6 |
| 5,778,647 | * | 7/1998 | McLean et al. ....................... 56/13.6 |
| 5,970,689 | * | 10/1999 | Hoffman et al. ............................ 56/6 |

* cited by examiner

Primary Examiner—Robert E. Pezzuto
(74) Attorney, Agent, or Firm—Larry W. Miller; John William Stader

(57) ABSTRACT

A disc mower conditioner utilizing a modular disc cutterbar to sever standing crop material by impact action. The side sheets of the disc mower conditioner are provided with a rolling crop divider that can be an optional attachment. The rolling crop divider is constructed as a series of overlapping rolling coulters mounted to the side sheet by bearings to enhance the rolling operation of the coulters. The rolling coulters effectively divide the crop material to direct tall and entangled crops into the header to be severed by the rotating knives. The coulters are arranged in a trailing orientation to present a curved leading edge that is highly effective in directing tall, entangled or viney crops downwardly into engagement with the adjacent disc cutter.

11 Claims, 5 Drawing Sheets

ROLLING CROP GUIDE FOR DISC MOWER CONDITIONERS

CROSS-REFERENCE TO RELATED APPLICATIONS

This application is a continuation-in-part of U.S. patent application Ser. No. 09/072,240, filed May 4, 1998, now U.S. Pat. No. 5,970,689, which is a division of U.S. patent application Ser. No. 08/670,060, filed Jun. 25, 1996, now U.S. Pat. No. 5,778,647, claiming priority on U.S. Provisional Patent Application Ser. No. 60/000,817, filed Jun. 26, 1995.

BACKGROUND OF THE INVENTION

This invention relates generally to a machine for severing standing crops from the ground to initiate a harvesting process and, more particularly, to a mower conditioner incorporating a rotary disc cutterbar having a preselected number of transversely oriented cutter modules having rotatable discs supported thereon and carrying knives to sever standing crop by an impact action and convey the severed crop to a conditioning mechanism before being discharged to the ground.

Disc cutterbars have been utilized in agricultural harvesting implements for many years. Each disc cutterbar includes a plurality of transversely spaced disc cutters driven for rotation about a generally vertical axis. Each disc cutter has two or three knives pivotally mounted on the periphery thereof to sever standing crop from the ground through an impact action. For background information on the structure and operation of disc cutterbars, reference is made to U.S. Pat. No. 4,815,262, issued to E. E. Koch and F. F. Voler, the descriptive portions thereof being incorporated herein by reference.

The construction of disc cutterbars has evolved over the years to the configuration of having a modular construction with cutter modules and spacer modules, such as shown in U.S. Pat. No. 4,840,019, issued to L. J. Pingry, the descriptive portions of which are incorporated herein by reference. In some instances, the cutter modules and the spacer modules were integrally formed into one unit such as shown and described in U.S. Pat. No. 4,947,629, issued to R. Ermacora and H. Neuerburg.

When cutting certain crops or under certain crop conditions, for example, tall and/or entangled crops or long viney crops, with a disc mower conditioner, a device is needed to guide the crop into the cutterbar knives so that the crop is cut cleanly instead of being pushed ahead of the machine, or being caught and pulled into the conditioning rolls without being cut by the rotating knives. Without an effective crop divider, such crops or crop conditions will cause a poor cutting of the crop, create a re-cutting of the crop, and/or plugging the machine. If the crop is not cut, but instead is pulled into the conditioning rolls, the power to the rolls increases significantly. The tractor engine RPM drops and the torque on the driveline components increases, and the lugs on the conditioning rolls wear. In addition, viney crop can wrap around the rolls if the vines are not cut.

SUMMARY OF THE INVENTION

It is an object of this invention to overcome the aforementioned disadvantages of the prior art by providing an improved crop divider for disc mower conditioners.

It is yet another object of this invention to provide a viney crop guide for the inboard end of a disc mower conditioner to force the viney crop into engagement with the first disc cutter.

It is another object of this invention that the crop divider is constructed to rotate as crop material is engaged thereby.

It is a feature of this invention that the crop guide is constructed of a series of generally circular members that provide a leading edge that has a curved portion to direct the crop downwardly as the guide is advanced into the crop to be cut.

It is another feature of this invention that the rolling crop guide can be used as an optional attachment mounted by fasteners from the mower conditioner header shroud.

It is still another feature of this invention that the rolling crop guide is constructed in the form of a series of rolling coulters that are mounted in bearings to facilitate operation thereof.

It is an advantage of this invention that the rolling coulters will rotate easily with the crop material engaged thereby.

It is another advantage of this invention that the rolling crop guide permits operation of a disc mower conditioner in severe crop conditions without increased power requirements resulting from the conditioning rolls engaging unsevered crop material.

It is yet another feature of this invention that both lateral opposing side sheets of the disc mower conditioner are provided with a rolling crop divider.

It is a further feature of this invention that the rolling coulters are arranged in an overlapping, trailing orientation to present a curved leading edge that is highly effective in dividing crops under difficult conditions.

It is still another object of this invention to provide a rolling crop divider for a disc mower conditioner that includes at least two rolling coulters mounted on the side sheet of the machine by bearings.

It is a further object of this invention to provide a disc mower conditioner incorporating a modular disc cutterbar which is durable in construction, inexpensive of manufacture, carefree of maintenance, facile in assemblage, and simple and effective in use.

These and other objects, features and advantages are accomplished according to the instant invention by providing a disc mower conditioner utilizing a disc cutterbar to sever standing crop material by impact action. The side sheets of the disc mower conditioner are provided with a rolling crop divider that can be an optional attachment. The rolling crop divider is constructed as a series of overlapping rolling coulters mounted to the side sheet by bearings to enhance the rolling operation of the coulters. The rolling coulters effectively divide the crop material to direct tall and entangled crops into the header to be severed by the rotating knives. The coulters are arranged in a trailing orientation to present a curved leading edge that is highly effective in directing tall, entangled or viney crops downwardly into engagement with the adjacent disc cutter.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
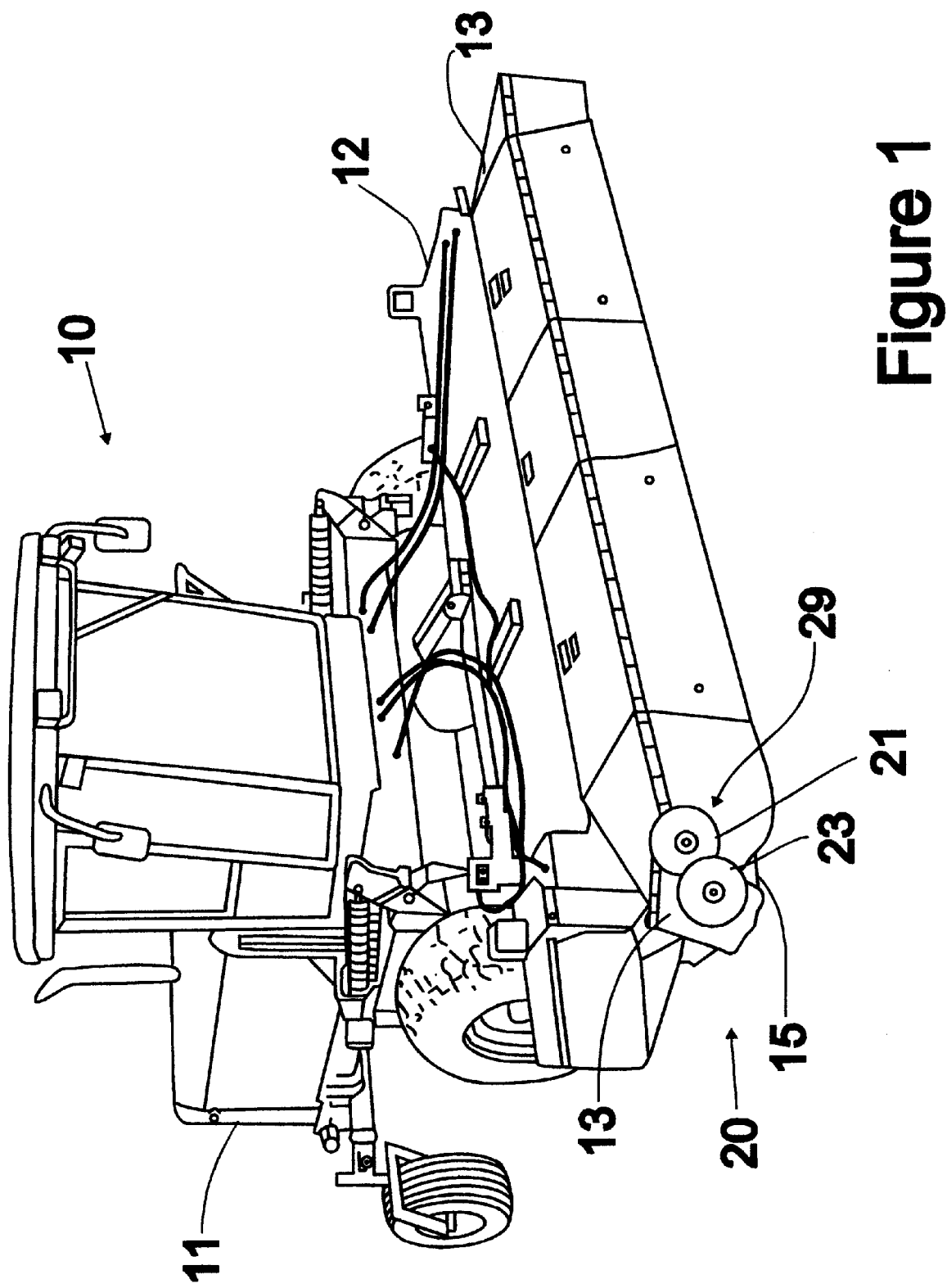
FIG. 1 is a right front perspective view of a self-propelled hay harvesting machine incorporating the principles of the instant invention.
Figure 3:
FIG. 3 is a photograph depicting an enlarged left rear prospective view of a hay harvesting machine incorporating the principles of the instant invention showing the operation of a rolling crop divider mounted on the side sheet of the crop harvesting header.

Referring now to the drawings and, particularly, to FIGS. 1 and 3, a self-propelled hay harvesting machine 10, commonly referred to as a windrower, having a disc mower conditioner header 12 operatively supported on the mobile base unit 11 and incorporating the principles of the instant invention can best be seen. Any left and right references are used as a matter of convenience and are determined by standing at the rear of the windrower 10 facing forwardly toward the crop harvesting header 12, the normal direction of travel.

The windrower 10 well known in the art and is provided with a disc-type crop harvesting header 12 mounted on the front of the mobile base unit 11 to engage standing crop material and sever the crop from the ground with a disc cutterbar 15. Rotational power is delivered from the base unit 11 to the disc-type header 12 by a power-take-off (PTO) shaft (not shown) in a conventional manner. Crop material is severed from the ground by an impact action of the rapidly rotating knives that engage the standing crop material as the windrower advances across a field. The severed crop is then moved through a conditioning mechanism, such as a pair of counter-rotating conditioning rolls, to crush and crimp the stems of the severed crop to facilitate the drainage of fluid therefrom and, thereby, enhance drying time.

Figure 2:
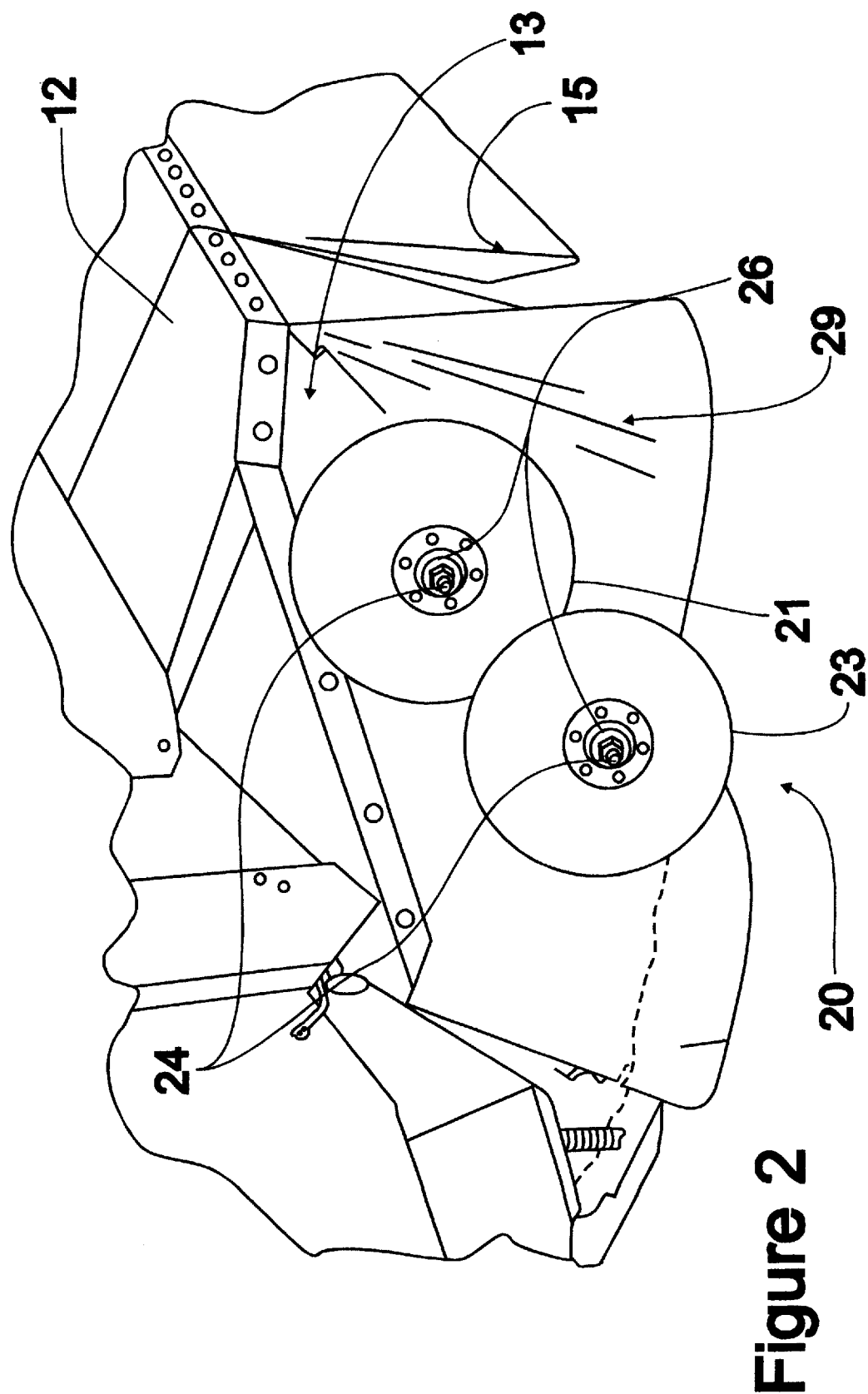
FIG. 2 is an enlarged right front perspective view of the crop harvesting header of the hay harvesting machine shown in FIG. 1 to better depict the details of the rolling crop divider mounted on the header side sheet.
Figure 4:
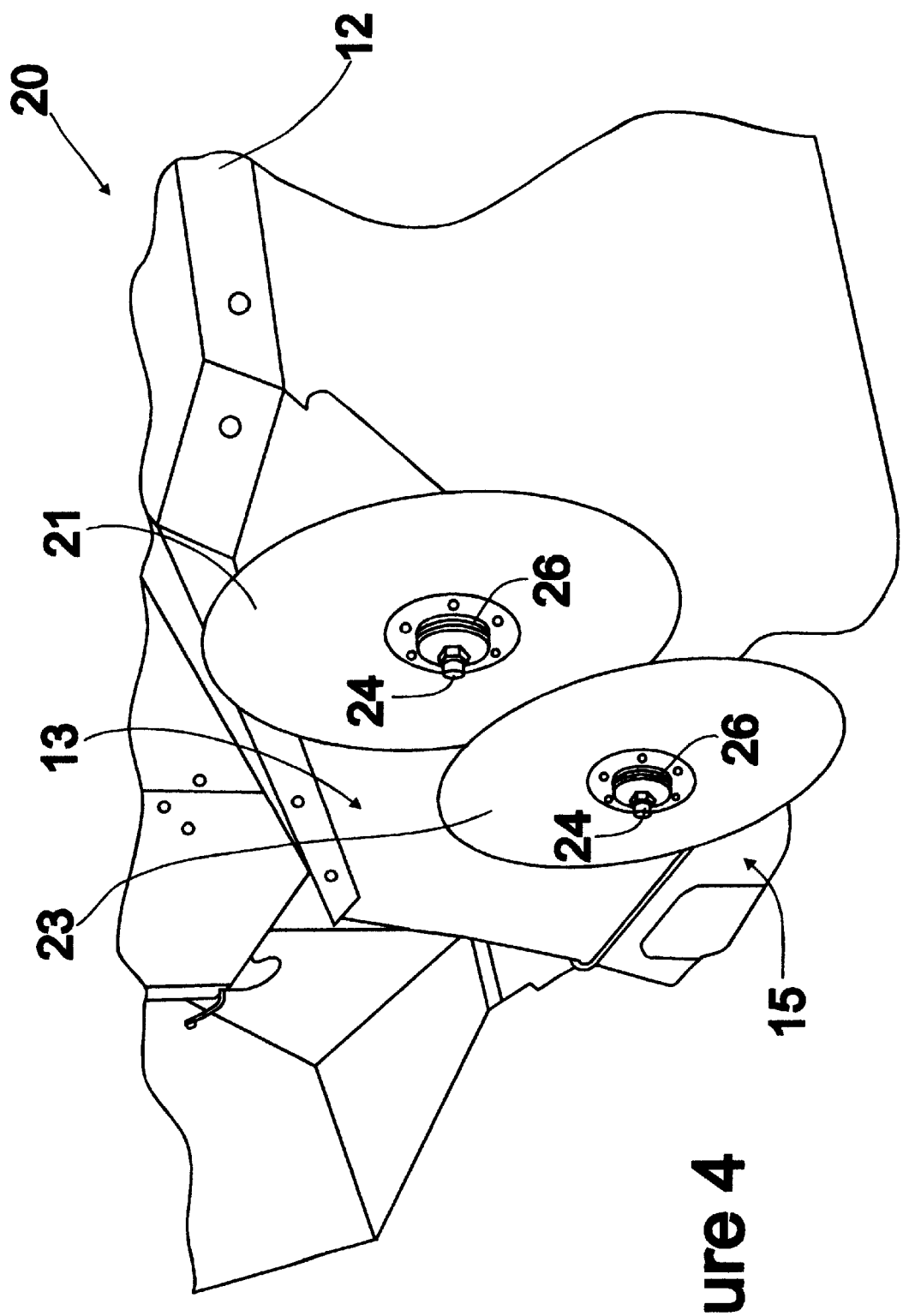
FIG. 4 is a photograph depicting an enlarged right front perspective view of the rolling crop divider mounted on the right side sheet of the crop harvesting header.

As best seen in FIGS. 2–4, an optional rolling crop divider 20 for use in assisting the proper cutting of difficult crops can best be seen. The crop divider 20 is mounted to both the left and right ends of the disc mower conditioner header 12 outboard of the cutterbar 15. The rolling crop divider 20 generally consists of a series of coulters 21, 23 rotatably mounted on the shroud structure 13 surrounding the respective ends of the cutterbar 15 by fasteners 24. The coulters 21, 23 are mounted on the side sheet structure 13 in an overlapping, trailing configuration in such a manner that the rolling crop divider 20 presents a curved forward edge 29 to the standing crop material, particularly when the crop material presents difficult conditions, such as when tall and/or entangled crops or viney crops are encountered.

Figure 5:
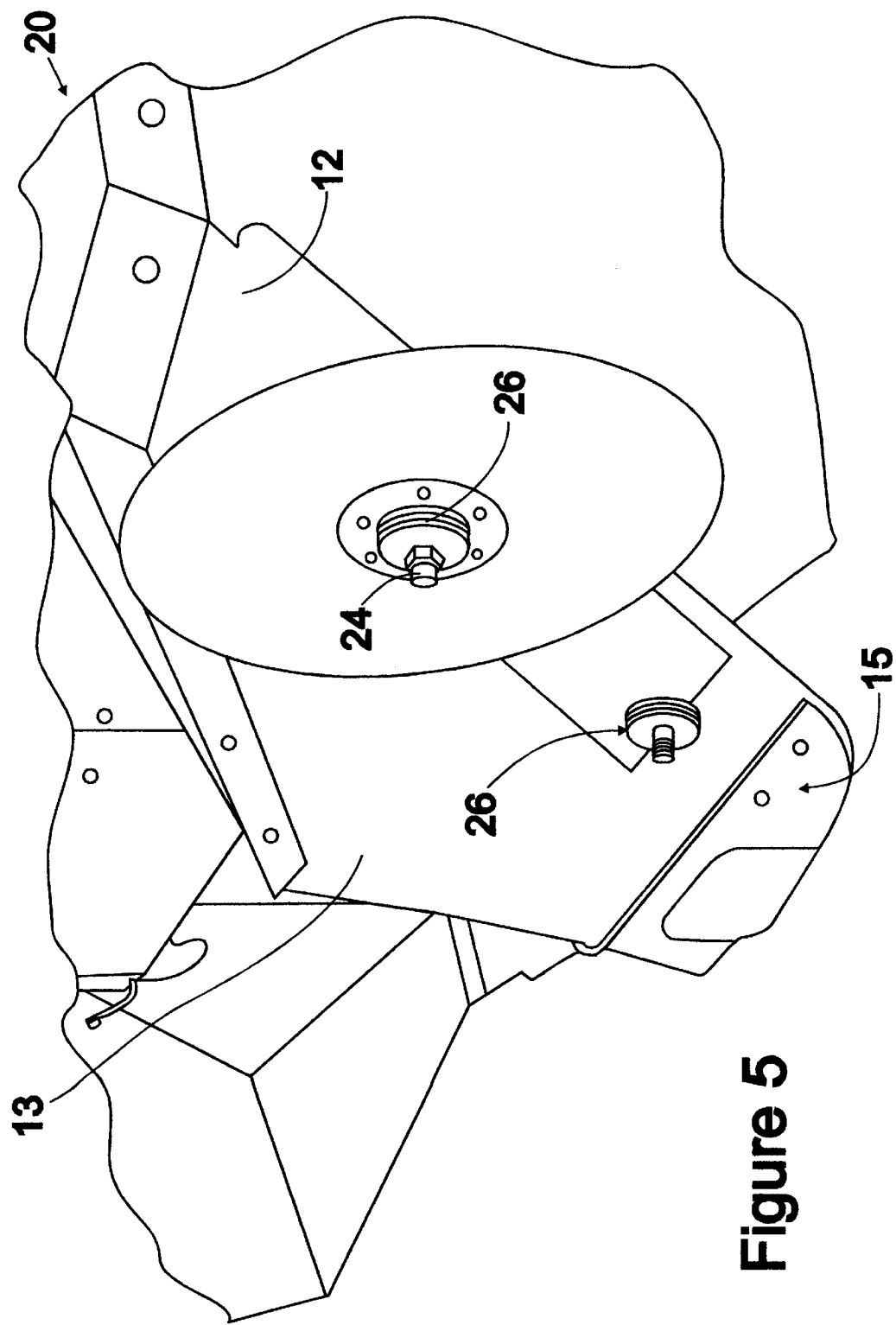
FIG. 5 is a photograph similar to that of FIG. 4, but having the lowermost coulter removed to better show the bearing mounting the rolling coulter to the side sheet of the crop harvesting header.

As best shown in FIG. 5, the coulters 21, 23 are mounted on bearings 26 to allow the coulters 21, 23 to rotate freely and guide crop material into the cutterbar 15. The curved forward edge 29 defined by the coulters 21, 23 presents a fine dividing line for the separation of crop material as the header 12 advances across the field, easily separating the crop. The lowermost periphery of the bottom coulter 23 is positioned at about the same elevation as the path of the rotating knives on the cutterbar 15 so that the lower coulter 23 does not dig into the ground to uproot crop. The uppermost periphery of the upper coulter 21 is preferably placed at about the same height as the top of the header 15.

Under some conditions, a third coulter (not shown) could be added to extend the overall length of the rolling crop divider. Under most crop conditions with a customary header, two coulters have been found to be as effective as three coulters; therefore, to minimize costs, the preferred configuration is two overlapping coulters 21, 23. By mounting the coulters 21, 23 to the header side sheets 13 by fasteners 24, the coulters 21, 23 can be easily added or removed, enabling the rolling crop divider 20 to be an optional attachment for disc mower conditioner headers that can be used under sever or difficult crop conditions or removed for normal crop conditions.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a mower conditioner having a mobile frame; a crop harvesting header suspended from said frame for movement relative thereto and including a cutterbar forwardly positioned from said header to sever standing crop material from the ground; said header having laterally opposing side sheets and a shroud encircling said cutterbar and being connected to said side sheets, the improvement comprising:

a rolling crop guide formed of rotatable members detachably connectable to said side sheets to separate and guide crop material toward said cutterbar for engagement therewith to sever said crop material.

2. The mower conditioner of claim 1 wherein said rotatable members are coulters rotatably supported on said header side sheets.

3. The mower conditioner of claim 2 wherein said coulters are supported on said side sheets by bearings to allow said coulters to rotate freely.

4. The mower conditioner of claim 3 wherein said coulters are mounted in an overlapping configuration to present a curved forward edge to the crop material to be divided thereby.

5. In a hay harvesting machine having a mobile base unit and a crop harvesting header supported on said base unit for severing crop material from the ground, said header having laterally opposed side sheets extending in a generally fore-and-aft position, the improvement comprising:

a rolling crop divider having at least two rotatable members rotatably supported on at least one of said header side sheets.

6. The hay harvesting machine of claim 5 wherein said rotatable members are coulters oriented generally parallel to said at least one side sheet.

7. The hay harvesting machine of claim 6 wherein said coulters are supported by bearings connected to said at least one side sheet by detachable fasteners.

8. The hay harvesting machine of claim 7 wherein the coulters are mounted in an overlapping configuration.

9. The hay harvesting machine of claim 7 wherein each of the opposing side sheets of said header have at least two coulters mounted thereon.

10. In a hay harvesting machine having a mobile base unit and a crop harvesting header supported on said base unit, said header having a disc cutterbar transversely extending between laterally opposed side sheets for severing crop material from the ground, the improvement comprising:

two coulters rotatably supported on each of said header side sheets in an overlapping orientation with respect to one another to form a rolling crop divider having a curved forward edge to separate standing crop material and guide crop material into said disc cutterbar to be severed thereby.

11. The hay harvesting machine of claim 10 wherein each said coulter is supported from the corresponding side sheet by a bearing detachably connected to said corresponding side sheet by a detachable fastener.

* * * * *